United States Patent Office 3,534,632
Patented Oct. 20, 1970

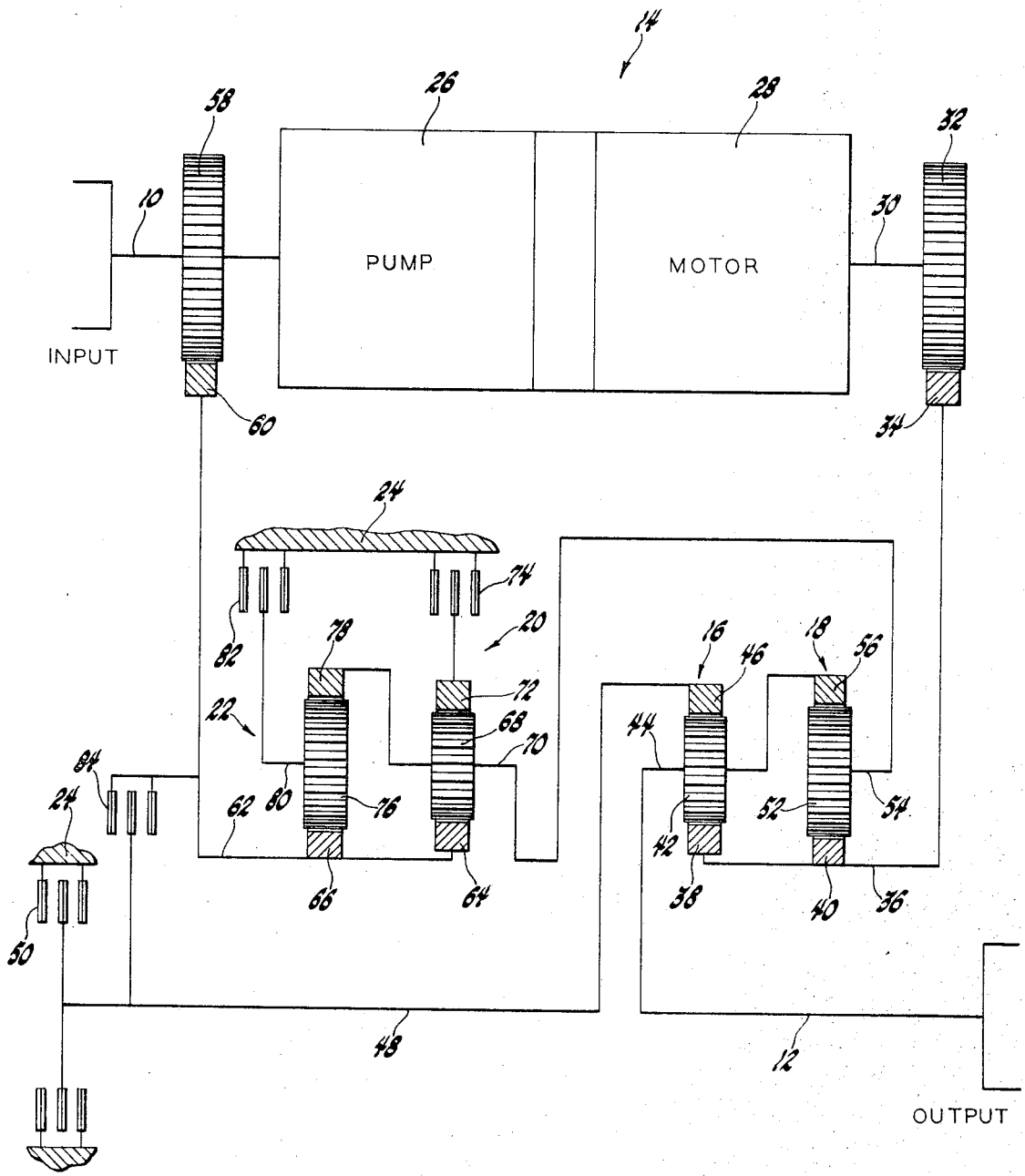

3,534,632
HYDROMECHANICAL TRANSMISSION HAVING FULL HYDROSTATIC AND OUTPUT SPLIT POWER DRIVES
Marion D. Smith, Indianapolis, Ind., assignor to General Motors Corporation, Detroit, Mich., a corporation of Delaware
Filed Jan. 3, 1969, Ser. No. 788,755
Int. Cl. F16h 37/06, 47/04
U.S. Cl. 74—687    9 Claims

ABSTRACT OF THE DISCLOSURE

A synchronous speed shifting hydromechanical transmission providing two forward-one reverse, two forward-two reverse, three forward-one reverse, and three forward-two reverse drive options.

---

This invention relates to hydromechanical transmissions and more particularly to vehicular hydromechanical transmissions providing full hydrostatic and output split power drives.

Different vehicles have different transmission requirements making it desirable to have a family of transmissions for meeting the various requirements wherein this family of transmissions has a maximum interchangeability of parts. This is desirable for several reasons including cost and maintenance. One area in which this is desirable is in heavy duty vehicles. For example, one working type vehicle has need for large torque multiplication over a low speed range in forward drive and over a smaller speed range in reverse while another working type vehicle has need for large torque multiplication over the same low speed range in forward and reverse drive and a hauling type vehicle has need for torque multiplication over a wide speed range in forward drive and a small speed range in reverse drive.

The invention is illustrated in a transmission comprising four planetary gear sets combined with a variable ratio hydrostatic drive unit to provide a synchronous speed shifting hydromechanical drive arrangement offering two forward-one reverse, two forward-two reverse, three forward-one reverse, and three forward-two reverse drive options. In all of the options, both the low speed ange forward drive and low speed range reverse drive are provided by transmitting full power through the hydrostatic drive unit with the control of speed ratio and direction of drive provided by control of the hydrostatic drive unit and one of the gear sets providing torque multiplication and speed reduction in the drive to the output. For a higher speed range forward drive, another of the gear sets is provided with reaction to establish a mechanical drive from the input to one of the two remaining gear sets which receives drive from the hydrostatic drive unit and combines these drives to provide an output split power type drive to the output. A higher speed range reverse drive is provided by the remaining gear set which is provided with reaction to establish mechanical drive from the input to the second named gear set which, with its drive from the hydrostatic drive unit, provides another output split power type drive to the output. In both of these higher speed range drives in forward and reverse, the hydrostatic drive unit with its variable speed ratio, controls the speed ratio between the input and output. The highest speed range forward drive available is provided by clutching the input to drive the reaction member of the first named gear set which with its drive from the hydrostatic drive unit provides another output split power type drive to the output in which the speed ratio is controlled by the hydrostatic drive unit. In addition, all of the drives are established by drive establishing devices which are speed synchronized by their connections in the arrangement.

An object of the present invention is to provide a new and improved transmission.

Another object is to provide a hydromechanical transmission providing two forward-one reverse, two forward-two reverse, three forward-one reverse, and three forward-two reverse drive options.

Another object is to provide a transmission having three planetary gear sets combined with a hydrostatic drive unit to provide two forward drives and one reverse drive with the low drive in forward and reverse provided by transmitting full power through the hydrostatic drive unit and one of the gear sets and the high forward drive provided by hydromechanical power transmittal by the remaining two gear sets and the hydrostatic drive unit.

Another object is to provide a transmission having three planetary gear sets combined with a hydrostatic drive unit to provide three forward drives and one reverse drive with the low drive in forward and reverse provided by transmitting full power through the hydrostatic drive unit and one of the gear sets and the two higher forward drives provided by hydromechanical power transmittal by the three gear sets and the hydrostatic drive unit.

Another object is to provide a transmission having four planetary gear sets combined with a hydrostatic drive unit to provide two forward drives and two reverse drives with the low drive in forward and reverse provided by transmitting full power through the hydrostatic drive unit and one of the gear sets and the high drive in forward and reverse provided by hydromechanical power transmittal by the remaining three gear sets and the hydrostatic drive unit.

Another object is to provide a transmission having four planetary gear sets combined with a hydrostatic drive unit to provide three forward drives and two reverse drives with the low drive in forward and reverse provided by transmitting full power through the hydrostatic drive and one of the gear sets and the two higher drives in forward and higher drive in reverse provided by hydromechanical power transmittal by the remaining three gear sets and the hydrostatic drive unit.

These and other objects of the present invention will be more apparent from the following description and drawing in which:

A diagrammatic view of a transmission according to the present invention is shown.

Referring to the drawing, the invention is illustrated in a transmission generally comprising an input shaft 10 operatively drivingly connected to an output shaft 12 by a variable ratio hydrostatic drive unit 14 and four simple planetary gear sets 16, 18, 20 and 22. All of the components are suitably supported in a transmission housing generally designated at 24 with the input shaft 10 adapted for connection to an engine and the ouput shaft 12 adapted for connection by a final drive train to the vehicle's driving wheels. The central axes of the input shaft 10 and hydrostatic drive unit are coincidental and parallel to the coincidental central axes of the four planetary gear sets 16, 18, 20 and 22 and the output shaft 12. This arrangement provides a compact transmission structure characterized by the short length.

Input power to the transmission is transmitted by the input shaft 10 which is connected to drive the pump 26 of the hydrostatic drive unit 14. Motor 28 which is hydraulically driven by pump 26 is connected to drive a motor output shaft 30. The hydrostatic drive unit 14 is conventional with the pump 26 having a variable displacement and the motor 28 preferably having a fixed displacement. At zero pump displacement the motor 28 and thus the motor output shaft 30 are hydraulically locked. On increasing the displacement of the pump 26 the motor output shaft is driven in one direction at increasing speed and on pump displacement of opposite sense the motor output shaft is driven in the opposite direction at increasing speed with maximum motor output shaft speed occurring at maximum pump displacement. It will of course be understood that the motor output speed can be extended by varying motor displacement.

The motor output shaft 30 is connected to a spur gear 32 which meshes with an annular spur gear 34 located about the output shaft 12. The gear 34 is connected at its hub by a sleeve shaft 36 to the respective annular sun gears 38 and 40 of gear sets 16 and 18. In gear set 16, the sun gear 38 meshes with a plurality of pinions 42 carried by a carrier 44 which is connected to the left or inboard end of output shaft 12, the output shaft 12 extending through sleeve shaft 36. Pinions 42 mesh with a ring gear 46 which is connected to the right end of a reaction-drive shaft 48 axially aligned with the output shaft 12. The left end of shaft 48 is connected to a first forward-reverse drive brake 50 which, on engagement, brakes the shaft 48 and thus ring gear 46 of gear set 16. Alternatively, the reaction-drive shaft 48 and thus the ring gear 46 may be driven by the input shaft 10 through a mechanical drive as described in more detail later. In gear set 18, the sun gear 40 meshes with a plurality of pinions 52 carried by a carrier 54 which may be driven by the input shaft 10 through one of two mechanical drives as described in more detail later. The pinions 52 mesh with a ring gear 56 which is connected to carrier 44 of gear set 16 and is thus connected to output shaft 12.

Input to the other two gear sets 20 and 22 is all mechanical and is provided from the input shaft 10 which is connected to a spur gear 58. Gear 58 meshes with an annular spur gear 60 which is located about the reaction-drive shaft 48. Gear 60 is connected by a sleeve shaft 62 to the respective sun gears 64 and 66 of gear sets 20 and 22, the sleeve shaft 62 being located about the reaction-drive shaft 48. In gear set 20, the sun gear 64 meshes with a plurality of pinions 68 carried by a carrier 70 which is connected to carrier 54 of gear set 18. Pinions 68 mesh with a ring gear 72 which is braked on engagement of a second forward drive brake 74. In gear set 22, the sun gear 66 meshes with a plurality of pinions 76. Pinions 76 mesh with a ring gear 78 which is connected to carrier 70 of gear set 20 and is thus connected to carrier 54 of gear set 18. The pinions 76 are carried by a carried 80 which is braked on engagement of a second reverse drive brake 82.

An all mechanical input drive is provided to ring gear 46 of gear set 16. This drive is effected by a third forward drive clutch 84 which, on engagement, clutches the input shaft driven gear 60 to the reaction-drive shaft 48 and thus to the ring gear 46 of the gear set 16.

The clutch and brakes of friction drive establishing devices are conventional and together with the hydrostatic drive unit may be operated in any known way, e.g. electrically, hydraulically, pneumatically, or by some mechanical provision and according to a certain schedule.

OPERATION

The transmission shown may be operated to provide three speed range forward drives and two speed range reverse drives wherein the speed ratio between input and output in each drive is infinitely variable by the variable speed ratio drive of the hydrostatic drive unit 14.

Neutral is provided by disengaging or releasing all of the drive establishing devices and conditioning the pump 26 for zero displacement. This disconnects all power paths from the output shaft 12 and conditions the transmission for drive establishment in either forward or reverse.

The first and lowest speed range forward drive is established by engaging only the first forward-reverse drive brake 50 to brake ring gear 46 of gear set 16. With power to input shaft 10 and on increasing the displacement of pump 26 in a certain sense, motor 28 drives sun gear 38 of gear set 16 in a forward direction with the speed increasing with increasing pump displacement. With sun gear 38 driven and ring gear 46 held, carrier 44 and connected output shaft 12 are driven in the same or forward direction at a reduced speed by the full hydrostatic drive, gear set 16 thus acting as a torque multiplier-speed reducer.

In the first speed range forward drive, sun gear 40 in gear set 18 is being driven in the forward direction by motor 28 while ring gear 56 of this gear set is being driven in the same direction by the output from gear set 16. These two driving members cooperatively produce drive in the same direction to carrier 54 of gear set 18 and thus to carrier 70 of gear set 20. In gear set 20 the sun gear 64 by its geared drive from the input shaft 10 is being driven in the same direction as carrier 70 and thus their speed components are subtractive in the drive to ring gear 72 of this gear set. This arrangement enables the gear sizes to be selected so that at a predetermined output speed of motor 28, preferably maximum motor speed which occurs at maximum pump displacement, the ring gear 72 is stationary, i.e. there is no relative speed between the brake members.

The shift from first to the second speed range forward drive is preferably accomplished when the above speed synchronized condition of the second forward drive brake 74 is reached. The first forward-reverse drive brake 50 is then released and the second forward drive brake 74 is engaged. With brake 74 engaged, mechanical drive is then transmitted from input shaft 10 by gear set 20 to carrier 54 of gear set 18 to drive carrier 54 in the forward direction with gear set 20 providing torque multiplication and speed reduction. With sun gear 40 rotating in the same direction as carrier 54, the speed component of the former drive member subtracts from that of latter drive member in the drive they provide to ring gear 56 and connected output shaft 12. Thus the speed of ring gear 56 and connected output shaft 12 increases with decreasing speed of sun gear 40 until the latter gear reaches zero speed. Then when sun gear 40 is rotated in the opposite or reverse direction, its speed components adds to that of carrier 54 so that the speed of ring gear 56 and connected output shaft 12 increases with increasing speed of sun gear 40 in the reverse direction. Thus, in the second speed range forward drive the displacement of pump 26 is initially decreased from maximum displacement to decrease the speed of sun gear 40 and thus increase the speed of output shaft 12 until zero pump displacement and thus zero speed of sun gear 40 is reached. Then the speed of the output shaft 12 is increased by increasing the displacement of pump 26 in the opposite sense to increase the speed of sun gear 40 in the reverse direction with maximum output speed of the motor being reached when maximum displacement of the pump is reached. The gear set 18 thus combines mechanical drive from the input shaft 10 through gear set 20 with the hydrostatic drive from hydrostatic drive unit 14 to provide a hydromechanical drive of the output split power type to output shaft 12. Downshifting from second to the first speed range forward drive is also provided with a speed synchronized condition at the first forward-reverse drive brake 50 by the drive to ring gear 46 which conditions the reaction-drive shaft 48 and thus the rotatable member of brake 50 at zero speed at the initial maximum motor speed in the second speed range forward drive.

In the last half of the second speed range forward drive the sun gear 38 in gear set 16 is driven by motor 28 in the reverse direction which is opposite that of the driven carrier 44. These two drives combine to drive ring gear 46 and the connected driven member of the third forward drive clutch 84 in the same or forward direction. With this arrangement, the driven clutch member is rotating in the same direction and at the same speed as the driving clutch member of the third forward drive clutch 84 at maximum motor speed.

The shift from second to the third speed range forward drive is preferably accomplished when the above speed synchronized condition of the third forward drive clutch 84 is reached. The second forward drive brake 74 is then released and the third forward drive clutch 84 is engaged. Mechanical drive is then delivered from the input shaft 10 through the engaged clutch 84 to drive ring gear 46 of gear set 16 in the forward direction. Since sun gear 38 is being driven by motor 28 in the reverse direction and thus opposite that of ring gear 46, the speed component of sun gear 38 subtracts from that of ring gear 46 in the drive to carrier 44 and connected output shaft 12. Thus the speed of carrier 44 and connected output shaft 12 increases with decreasing speed of sun gear 38 until sun gear 38 reaches zero speed. Then when sun gear 38 is rotated in the forward direction its speed component adds to that of ring gear 46 so that the speed of carrier 44 and connected output shaft 12 then increases with increasing speed of sun gear 38 in the forward direction. Thus, in the third speed range forward drive the displacement of pump 26 is decreased from maximum displacement to zero to maximum displacement of the opposite sense to continue increasing the speed of carrier 44 and the output shaft 12. The gear set 16 thus combines the mechanical drive from input shaft 10 through clutch 84 with the hydrostatic drive from hydrostatic drive unit 14 to provide another hydromechanical drive of the output split power type and of higher speed ratio to drive the output shaft 12. Downshifting from third to the second speed range forward drive is also provided with a speed synchronized condition at the second forward drive brake 74 by sun gear 64 and carrier 70 in gear set 20 which establish ring gear 72 at zero speed at initial maximum speed of motor 28 in the third speed range forward drive.

The first and lowest speed range reverse drive is established by engaging only the first forward-reverse drive brake 50, all other drive establishing devices being disengaged like for the first speed range forward drive. The displacement of pump 26 is increased from zero in a sense opposite to that in the first speed range forward drive to drive sun gear 38 of gear set 16 and thus the output 12 in the reverse direction. Thus, this drive is like that in the first speed range forward drive except that motor 28 is driven in an opposite direction by pump 26.

In the last half of the first speed range reverse drive the sun gear 66 of gear set 22 is driven in the forward direction by the input 10 while ring gear 78 is driven in the reverse direction by carrier 54 of gear set 18. These two driving members combine in gear set 22 to drive carrier 80 and since they are rotating in opposite directions, their speed components are substractive in this drive. This arrangement enables the gear sizes to be selected so that at the maximum speed of motor 28 in the reverse direction, the rotatable member of the second reverse drive brake 82 is stationary and thus there is no relative rotation in this brake.

The shift from first to the second speed range reverse drive is preferably accomplished when the above speed synchronized condition of the second reverse drive brake 82 is reached. The first forward-reverse drive brake 50 is then released and the second reverse brake 82 is engaged. With the second reverse brake 82 engaged, mechanical drive is provided from the input shaft 10 to carrier 54 of gear set 18 with the gear set 22 providing torque multiplication, speed reduction and direction reversal. Thus carrier 54 is driven in the reverse direction the same as sun gear 40 which is being driven by motor 28. The speed component of sun gear 40 thus subtracts from that of carrier 54 in the drive to ring gear 56 and connected output shaft 12. Accordingly, the speed of ring gear 56 and connected output shaft 12 in the reverse direction increases with decreasing speed of sun gear 40 until the latter gear reaches zero speed. Then when sun gear 40 is rotated in the forward direction, its speed component adds to that of carrier 54 so that the speed of ring gear 56 and connected shaft 12 then increases with increasing speed of sun gear 40 in the forward direction. Thus, in the second speed range reverse drive the displacement of pump 26 is decreased from its maximum displacement to zero and is then increased to maximum displacement of opposite sense to continuously increase the speed of output shaft 12. Downshifting from second to the first speed range reverse drive is also provided with a speed synchronized condition in the first forward-reverse drive brake 50 by the drive to ring gear 46 of gear set 16, this condition occurring at initial maximum speed of motor 28 in the second speed range reverse drive.

The arrangement shown can be used in either a working or hauling type vehicle. Moreover, a two forward-one reverse drive option particularly suited for a working type vehicle is available by not utilizing the gear set 22, second reverse drive brake 82 and third forward drive clutch 84, a two forward-two reverse drive option particularly suited for a working-loading type vehicle is available by not using the third forward drive clutch 84, and a three forward-one reverse drive option particularly suited for a hauling type vehicle is available by not using the gear set 22 and brake 82. Furthermore, this complete family is available with a large number of interchangeable parts since the utilization of only the gear set 22, brake 82 and clutch 84 is involved in the selection between the many possible uses.

The above described preferred embodiment is illustrative of the present invention which may be modified within the scope of the appended claims.

I claim:

1. In a transmission the combination of an input shaft; an output shaft; a variable ratio hydrostatic drive unit connected to be driven by said input shaft and providing a bidirectional variable speed ratio drive; a first planetary gear set having an input member connected to be driven by the bidirectional variable speed ratio drive of said hydrostatic drive unit, an output member connected to drive said output shaft, a reaction member and a brake for braking said reaction member to establish a drive to said output shaft; a second planetary gear set having a first input member connected to be driven by the bidirectional variable speed ratio drive of said hydrostatic drive unit, a second input member and an output member connected to drive said output shaft; and a third planetary gear set having an input member connected to be driven by said input shaft, an output member connected to drive said second input member of said second planetary gear set, a reaction member and a brake for braking said reaction member to establish drive to said second input member whereby on engagement of the first mentioned brake there is provided the same speed range drive in forward and reverse from said input shaft to said output shaft and on engagement of the last mentioned brake there is provided a higher speed range forward drive from said input shaft to said output shaft with the speed ratio in each speed range drive made variable by the variable speed ratio drive of said hydrostatic drive unit.

2. The transmission set forth in claim 1 and a clutch for clutching said input shaft to drive said reaction member of said first planetary gear set to provide a higher speed range forward drive from said input shaft to said output shaft with the speed ratio in this higher speed range forward drive also made variable by the variable speed ratio drive of said hydrostatic drive unit.

3. The transmission set forth in claim 1 and a fourth planetary gear set having an input member connected to be driven by said input shaft, an output member connected to drive said second input member of said second planetary gear set, a reaction member and a brake for braking said reaction member to establish drive to said second input member and provide a higher speed range reverse drive from said input shaft to said output shaft with the speed ratio in this higher speed range reverse drive also made variable by the variable speed ratio drive of said hydrostatic drive unit.

4. The transmission set forth in claim 1 and a clutch for clutching said input shaft to drive said reaction member of said first planetary gear set to provide a higher speed range forward drive from said input shaft to said output shaft with the speed ratio in this higher speed range forward drive also made variable by the variable speed ratio drive of said hydrostatic drive unit, a fourth planetary gear set having an input member connected to be driven by said input shaft, an output member connected to drive said second member of said second planetary gear set, a reaction member and a brake for braking said reaction member to establish drive to said second input member and provide a higher speed range reverse drive from said input shaft to said output shaft with the speed ratio in this higher speed range reverse drive also made variable by the variable speed ratio drive of said hydrostatic drive unit.

5. In a transmission the combination of an input shaft; an output shaft; a variable ratio hydrostatic drive unit connected to be driven by said input shaft and providing a bidirectional variable speed ratio drive; a first planetary gear set having a sun gear connected to be driven by the bidirectional variable speed ratio drive of said hydrostatic drive unit, a carrier connected to drive said output shaft, a ring gear, a pinion carried by said carrier and meshing with said sun gear and ring gear and a brake for braking said ring gear; a second planetary gear set having a sun gear connected to be driven by the bidirectional variable speed ratio drive of said hydrostatic drive unit, a ring gear connected to drive said output shaft and a carrier carrying a pinion meshing with said sun gear and ring gear; and a third planetary gear set having a sun gear connected to be driven by said input shaft, a carrier connected to drive said carrier of said second planetary gear set, a ring gear, a pinion carried by said carrier and meshing with said sun gear and ring gear and a brake for braking said ring gear.

6. The transmission set forth in claim 5 and a clutch for clutching said input shaft to drive said ring gear of said first planetary gear set.

7. The transmission set forth in claim 5 and a fourth planetary gear set having a sun gear connected to be driven by said input shaft, a ring gear connected to drive said carrier of said second planetary gear set, a carrier carrying a pinion meshing with said sun gear and a ring gear and a brake for braking said carrier.

8. The transmission set forth in claim 5 and a clutch for clutching said input shaft to drive said ring gear of said first planetary gear set, a fourth planetary gear set having a sun gear connected to be driven by said input shaft, a ring gear connected to drive said carrier of said second planetary gear set, a carrier carrying a pinion meshing with said sun gear and ring gear and a brake for braking said carrier.

9. A transmission having continuous output speed drives effected by friction drive engagement at substantially zero relative speed comprising in combination an input shaft; an output shaft; a variable ratio hydrostatic drive unit having an input member driven by said input shaft and also having a variable speed output member; a first and a second planetary gear set each having a first and a second member and a third member having a speed proportional to the speed differential of the first and the second member; means drivingly connecting the first member of each said first and said second gear set to said variable speed output member; means drivingly connecting the third member of each said first and said second gear set to said output shaft; selectively operable first friction brake elements for selectively braking the second member of said first gear set: a third planetary gear set having a first and a second member and a third member having a speed proportional to the speed differential of the first and the second member; means drivingly connecting the third member of said third gear set to the second member of said second gear set; means drivingly connecting the first member of said third gear set to said input shaft whereby on engagement of said first friction brake elements a first speed range drive is established to said output shaft and the speed of the second member of said third gear set decreases while output shaft speed increases as said variable speed output member increases in speed to a predetermined speed; and selectively operable second brake elements for selectively braking the second member of said third gear set to establish a second speed range drive to said output shaft whereby output shaft speed may be increased by engagement of said second friction brake elements at substantially zero relative speed at said predetermined speed of said variable speed output member and the speed of the second member of said first gear set increases from zero while output shaft speed increases as said variable speed output member decreases in speed and whereby output shaft speed may be decreased by re-establishment of said first speed range drive by disengagement of said second friction brake elements and engagement of said first friction brake elements at substantially zero relative speed at said predetermined speed of said variable speed output member.

References Cited

UNITED STATES PATENTS

| | | | |
|---|---|---|---|
| 3,377,885 | 4/1968 | Tuck et al | 74—720.5 |
| 3,470,769 | 10/1969 | Livezey | 74—720.5 |

ARTHUR T. McKEON, Primary Examiner

U.S. Cl. X.R.

74—665